R. F. COOKE.
Horseshoes.
No. 144,833. Patented Nov. 25, 1873.
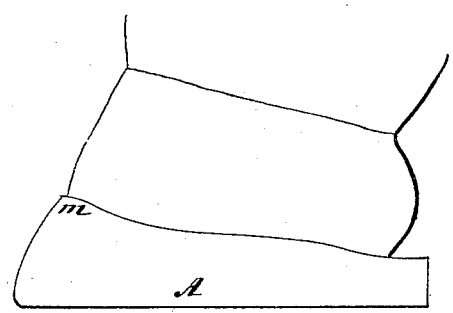
Fig. I.
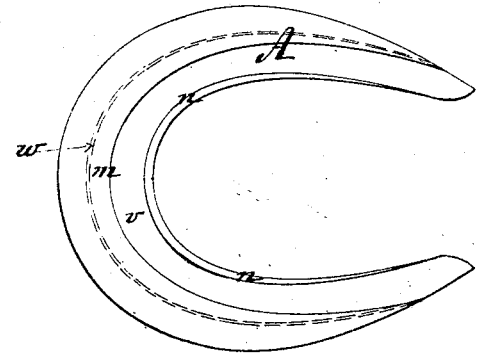
Fig. II.
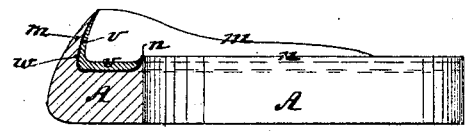
Fig. III.
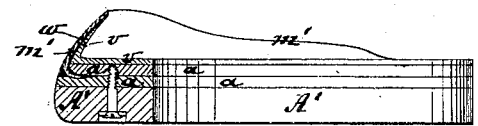
Fig. IV.
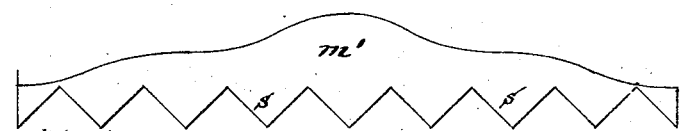
Fig. V.
Witnesses.
F. McEwan.
C. Thornton.
Inventor.
Robert F. Cooke
per Henry E. Roeder
attorney.

UNITED STATES PATENT OFFICE.

ROBERT F. COOKE, OF BROOKLYN, NEW YORK.

IMPROVEMENT IN HORSESHOES.

Specification forming part of Letters Patent No. 144,833, dated November 25, 1873; application filed July 30, 1873.

*To all whom it may concern:*

Be it known that I, ROBERT F. COOKE, of Brooklyn, Kings county and State of New York, have invented a new and Improved Horseshoe, and mode of attaching the same to horses' feet, of which the following is a specification:

This invention relates to india-rubber horseshoes; and consists of a shoe made either wholly of india-rubber, or of india-rubber in combination with leather, felt, or its equivalent, and provided on the top with suitable lips or projections around the outer edge, or around the outer and inner edges, lined with gutta-percha, by means of which the shoe can be firmly attached to the horse's hoof.

In the accompanying drawing, Figure I represents an outside view of a horseshoe, attached to a horse's hoof, embodying my invention. Fig. II is a top view of the same. Fig. III is a longitudinal section of a horseshoe made of india-rubber. Fig. IV is a longitudinal section of a horseshoe made of india-rubber combined with leather, and Fig. V shows the mode of making the front lip for shoe shown in Fig. IV.

Similar letters represent similar parts.

A represents the shoe, made of india-rubber, molded similar in form to a common iron horseshoe, and made of any desired thickness. Around its outer edge, on top, a lip or projection, $m$, about one inch high at the center in front, and about one-half of an inch high on the sides, is arranged, and around its inner edge a small lip or projection, $n$, about one-quarter of an inch in height, is made. The inner surfaces of these lips $m$ and $n$, and the top surface of the shoe, are lined with canvas, or a similar substance, and made to adhere firmly to the india-rubber, as represented by the black line $w$, Fig. III. This cloth or canvas lining $w$ will strengthen the india-rubber shoe, and at the same time make the gutta-percha adhere firmly to the same. The space between the projections $m$ and $n$ and the top part of the shoe is filled or lined with gutta-percha, $v$, mixed with rosin, shellac, or similar suitable gum, about one-quarter of an inch in thickness.

For cart or working horses, I construct the shoe as represented in Fig. IV, where $A'$ is the india-rubber shoe, made of the desired shape, and of any desirable thickness, on the top of which two or three thicknesses, $a\ a$, of leather or other suitable material is fastened, between which the lip or projecting piece $m'$ is fastened, and the whole firmly secured together by a number of suitable screws, $x$. The top of the leather $a$ and the inside of the lip $m'$ is then filled or lined with gutta-percha, $v$, similar as above described.

These shoes are formed or molded of different sizes, to correspond with the sizes and shapes of the horse's hoofs.

When the shoe is to be attached to the horse's hoof, an iron is forged to correspond with the exact shape of the under side of the horse's hoof. This iron form is then heated, and applied to the under side of the hoof a sufficient length of time to heat the same, and is then pressed into the shoe upon the gutta-percha lining $v$ to heat and partially melt the same, leaving thereby the exact impression of the shape of the hoof in the gutta-percha. The thus-heated hoof is then pressed upon the melted gutta-percha into the projecting lip $m$ or $m'$, which latter is then pressed against the outside of the hoof, causing the same, by means of the gutta-percha, firmly to adhere to the hoof. The lip $n$ around the inner edge of the shoe, or the gutta-percha which has been pressed out at the inside when the hoof has been pressed upon the shoe, is then pressed against the inside of the hoof, securing thereby firmly the inner side of the shoe to the inner side of the horse's hoof.

By this mode the india-rubber shoe, or the india-rubber shoe combined with leather or other suitable material, is securely fastened to the horse's hoof, and will remain firmly attached until the shoe is worn away, when the same can be either taken off by inserting the hoof into hot water, which will partly melt the gutta-percha, or, when a shoe as represented in Fig. IV has been used, the india-rubber part $A'$ can be taken off, and replaced by a new piece.

In a shoe constructed as represented in Fig. IV, I cut the lip or projection $m'$ with points $s$, as shown in Fig. V, which are bent and inserted between the leather $a\ a$.

In some cases it may be advisable to insert an iron toe and calks into the india-rubber part of the shoe, which are then placed into the mold, when the shoe is molded and embedded into the india-rubber part.

I am aware that horseshoes have been made before of india-rubber, and do not claim therefore, broadly, a horseshoe made of india-rubber; but

What I claim as my invention, and desire to secure by Letters Patent, is—

1. A horseshoe made of india-rubber, having an outer lip or projection, $m$, and inner lip or projection, $n$, running around the hoof, in combination with a cloth or canvas lining, $w$, and gutta-percha filling, $v$, substantially as and for the purpose set forth.

2. The combination of the india-rubber shoe $A'$, two or more thicknesses of leather, $a\ a$, or its equivalent, the outer lip or projection $m'$, and gutta-percha lining $v$, substantially as and in the manner specified.

3. The cloth or canvas lining $w$, to strengthen the horseshoe and act as a means of connecting the india-rubber and gutta-percha together.

4. The herein-described mode of attaching horseshoes made of india-rubber, or india-rubber combined with leather or similar suitable material, to the horse's hoof by means of gutta-percha mixed with rosin, shellac, or similar resinous gums, substantially as set forth.

ROBERT F. COOKE.

Witnesses:
HENRY E. ROEDER,
C. THORNTON.